(12) United States Patent
Boutaghou

(10) Patent No.: US 6,519,113 B1
(45) Date of Patent: Feb. 11, 2003

(54) SPINDLE MOTOR ASSEMBLY WITH POLYMERIC MOTOR SHAFT AND HUB FOR ROTATING A DATA STORAGE DISK

(75) Inventor: Zine-Eddine Boutaghou, Vadnais Height, MN (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/600,268

(22) PCT Filed: Apr. 25, 2000

(86) PCT No.: PCT/US00/11017

§ 371 (c)(1),
(2), (4) Date: Jul. 13, 2000

(87) PCT Pub. No.: WO00/65707

PCT Pub. Date: Nov. 2, 2000

Related U.S. Application Data

(60) Provisional application No. 60/131,849, filed on Apr. 28, 1999.

(51) Int. Cl.[7] .................................................. G11B 17/02
(52) U.S. Cl. ................... 360/99.08; 310/67 R
(58) Field of Search ......................... 360/99.08, 104, 360/99.05, 99.12; 310/262, 43, 349, 67 R, 51, 156.26; 29/598

(56) References Cited

U.S. PATENT DOCUMENTS

| | | | | |
|---|---|---|---|---|
| 3,840,897 A | * | 10/1974 | Kelley et al. ............. | 360/99.05 |
| 4,127,342 A | * | 11/1978 | Coggiola ..................... | 403/24 |
| 4,231,670 A | * | 11/1980 | Knoski ........................ | 403/11 |
| 4,607,539 A | * | 8/1986 | Arima et al. ................. | 74/492 |
| 4,835,840 A | * | 6/1989 | Stokes ......................... | 29/598 |
| 4,883,408 A | * | 11/1989 | Borcherding ............. | 416/93 R |
| 5,206,554 A | | 4/1993 | Perrot ................... | 310/40 MM |
| 5,278,712 A | * | 1/1994 | Sugaya ........................ | 360/104 |
| 5,579,188 A | * | 11/1996 | Dunfield et al. ......... | 310/156.26 |
| 5,600,513 A | * | 2/1997 | Nakata et al. ............ | 360/99.08 |
| 5,606,448 A | | 2/1997 | Suzuki et al. ................ | 359/200 |
| 5,710,678 A | | 1/1998 | Leuthod et al. ........... | 360/99.08 |
| 5,729,404 A | | 3/1998 | Dunfield et al. .......... | 360/99.08 |
| 5,828,518 A | | 10/1998 | Moir et al. .............. | 360/99.12 |
| 5,834,868 A | * | 11/1998 | Yoshikawa et al. ........ | 310/67 R |
| 5,856,624 A | | 1/1999 | Elsing ......................... | 73/865.9 |
| 5,866,961 A | * | 2/1999 | Suzuki et al. ............. | 310/67 R |
| 5,867,346 A | * | 2/1999 | Teshima ................... | 360/99.08 |
| 5,872,681 A | * | 2/1999 | Boutaghou ................ | 360/99.12 |
| 5,880,905 A | | 3/1999 | Kazmierczak et al. ... | 360/98.08 |
| 5,895,203 A | * | 4/1999 | Klein ....................... | 415/122.1 |
| 5,945,752 A | * | 8/1999 | Ishizuka ................... | 310/67 R |
| 6,040,649 A | * | 3/2000 | Horng ....................... | 310/67 R |
| 6,133,655 A | * | 10/2000 | Suzuki et al. .................. | 310/51 |
| 6,201,329 B1 | * | 3/2001 | Chen ........................ | 310/90.5 |
| 6,205,110 B1 | * | 3/2001 | Miyamoto et al. .......... | 369/266 |

FOREIGN PATENT DOCUMENTS

| | | | |
|---|---|---|---|
| EP | 0266991 A2 | * | 5/1988 |
| GB | 2310026 A | * | 8/1997 |

OTHER PUBLICATIONS

Patent Abstracts of Japan, Publication No. 08308172 (Nov. 22, 1996).
Patent Abstracts of Japan, Publication No. 11117935 (Apr. 27, 1999).

* cited by examiner

*Primary Examiner*—Brian E. Miller
*Assistant Examiner*—Tianjie Chen
(74) *Attorney, Agent, or Firm*—Fish & Richardson P.C.

(57) ABSTRACT

A spindle motor assembly (18) includes a polymeric motor shaft (20), a polymeric hub (22) to support a rotating disc (24), and a stator (40) disposed in an internal cavity defined by the hub. A resilient snap-in retainer (62) is molded to the motor shaft (20) to hold the hub (22) in place. A surface of the polymeric hub and an opposing surface of the polymeric motor shaft form a hydrodynamic bearing.

19 Claims, 5 Drawing Sheets

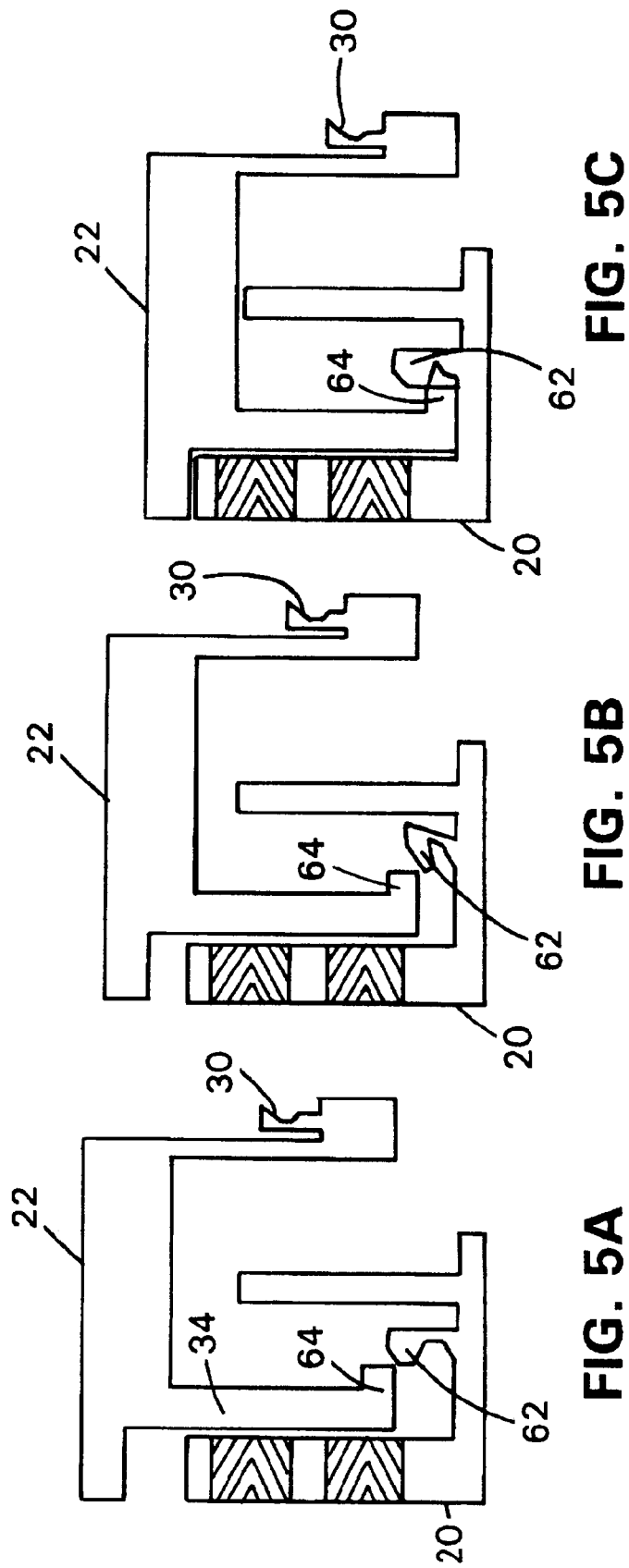

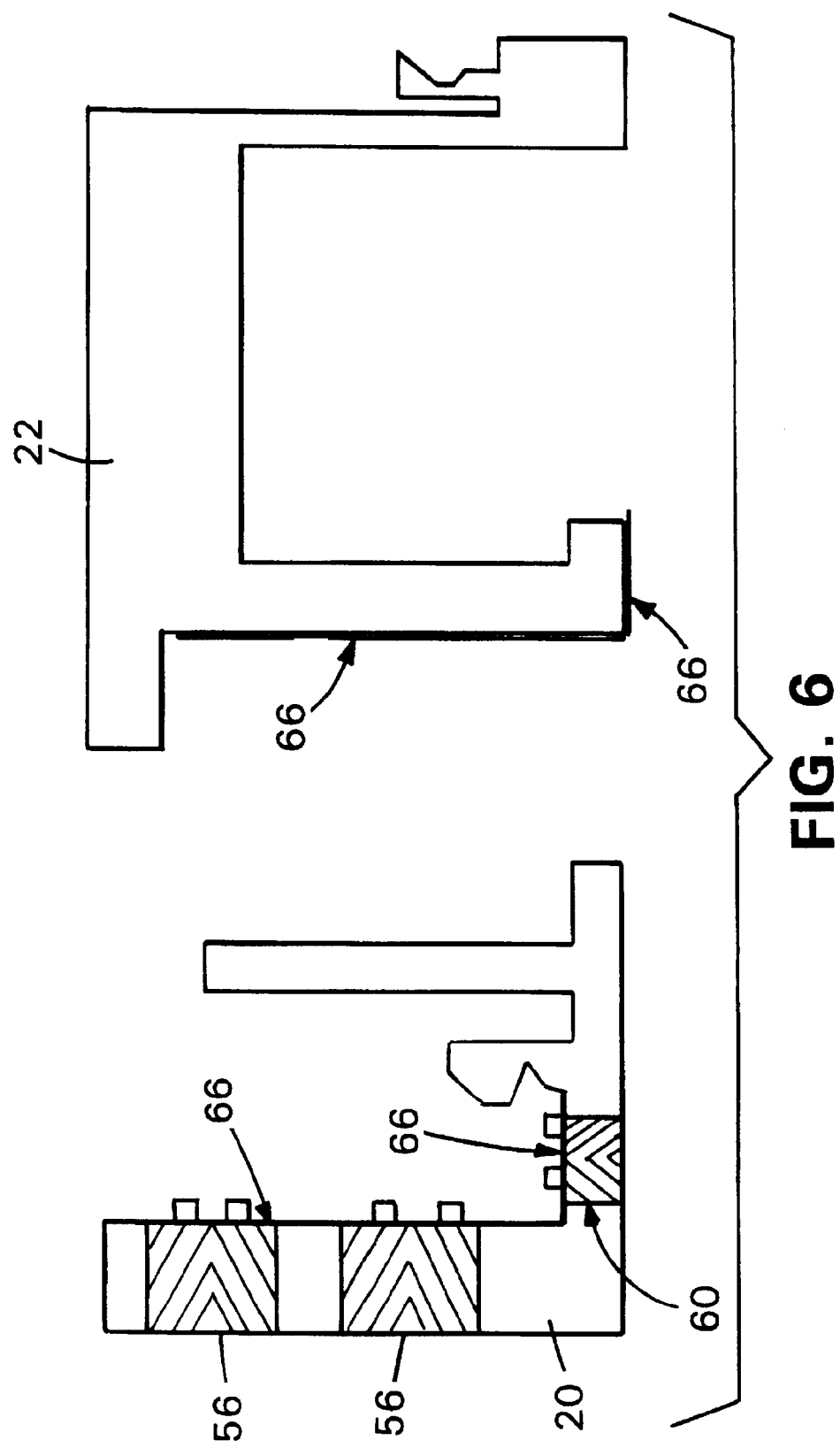

SPINDLE MOTOR ASSEMBLY WITH POLYMERIC MOTOR SHAFT AND HUB FOR ROTATING A DATA STORAGE DISK

This application claims the benefit of No. 60/131,849, filed Apr. 28, 1999.

BACKGROUND

The invention relates generally to hydrodynamic bearing assemblies of the type that provide support and rotation for high-speed spindle elements. Such hydrodynamic bearing assemblies can be utilized, for example, in computer disc drive recording systems.

Disc drive memory systems are used in computers for storage of digital information that can be recorded on concentric tracks of a magnetic disc medium. One or more discs are rotatably mounted on a spindle, and the information, which can be stored in the form of magnetic transitions within the discs, is accessed using read/write heads or transducers. The read/write heads are located on a pivoting arm which moves radially over the surface of the disc. The read/write heads must be accurately aligned with the storage tracks on the disc to ensure the proper reading and writing of information.

During operation, the discs are rotated at high speeds within an enclosed housing using an electric motor located inside a hub or below the discs. One type of motor in known as an in-hub or in-spindle motor. Such motors typically have a spindle mounted by means of two ball bearing systems to a motor shaft disposed in the center of the hub. One of the bearings is located near the top of the spindle and the other near the bottom. The bearings permit rotational movement between the shaft and the hub while maintaining proper alignment of the spindle to the shaft. The bearings can be lubricated with grease or oil.

The conventional bearing system described above is prone to several problems, including vibrations generated by the balls rolling on the associated raceways. The strict requirements of shock resistance for hard disc drives in portable computer equipment also makes the use of such conventional systems less desirable. Another problem relates to the fact that mechanical bearings are not always scalable to smaller dimensions. That is a significant drawback because the trend in the disc drive industry has been to continually reduce the physical dimensions of the disc drive unit.

As an alternative to the conventional ball bearing systems, hydrodynamic bearing systems have been developed. In a hydrodynamic bearing system, a lubricating fluid, such as a gas or liquid, serves as the bearing surface between a stationary base or housing and the rotating spindle or rotating hub. The size of the gap between the rotating hub and the stationary portion of the motor must be tightly controlled to obtain good dynamic performance.

Unfortunately, the control required for the dimensions of the gap makes machining those sections costly. Furthermore, variations in the manufacturing process that result from machining metal sections of the disc drive system make it difficult to obtain a gap with specified dimensions in a repeatable fashion.

SUMMARY

In general, a spindle motor assembly includes a polymeric motor shaft, a polymeric hub to support a rotating disc, and a stator disposed in an internal cavity defined by the hub. An outer surface of the motor shaft and an opposing surface of the hub form a hydrodynamic journal bearing.

One or more of the following features may be included in various implementations. A resilient snap-in retainer can be molded to the hub to hold the disc in place. Alternatively, a fastener molded to the hub can hold the disc in place. A resilient snap-in retainer can be molded to the motor shaft to hold the hub in place.

The stator can include coils and one or more magnets can be connected to the hub such that during operation of the disc drive, the magnets interact with the coils to cause rotational movement of the hub about the motor shaft. The magnets can be attached to a back-iron that is attached to the hub. Additionally, a flux conducting ring can be disposed at an outer perimeter of a horizontal extension of the motor shaft. The flux conducting ring can provide a thrust bearing to facilitate operation of the spindle motor assembly.

Pressure generating features can be formed in the polymeric motor shaft. During operation, the journal bearing and pressure generating features create a pressure gradient in a gap between the surface of the motor shaft and the opposing surface of the hub. The pressure generating features can include, for example, spiral grooves formed in the motor shaft or Rayleigh steps formed in the motor shaft.

A solid lubricant can be disposed on the hub on a surface where the hub contacts the motor shaft during operation of the spindle motor assembly. Similarly, a solid lubricant can be disposed on a surface of the motor shaft that contacts the hub during operation of the spindle motor assembly.

The spindle motor assembly can form, for example, part of a computer disc drive.

According to another aspect, a method of assembling a spindle motor assembly for a computer disc drive includes positioning a hub over a motor shaft, pressing the hub downward so that an extension on the hub contacts a snap-in retainer molded to the motor shaft, and allowing the snap-in retainer to spring back to hold the hub in place.

In some implementations, the hub defines an internal cavity for a stator when the hub is held in place by the snap-in retainer. A disc can be held in place with a snap-in retainer molded to the hub.

Some implementations include one or more of the following advantages. Forming the hub and/or motor shaft with a polymeric material can facilitate the achievement of tight control of dimensions of those components during fabrication to obtain improved dynamic performance. Use of polymeric materials also can result in more repeatable manufacturing techniques. Known techniques, such a mold injection, can be incorporated into the manufacturing process to make the hub and motor shaft, and other components can easily be molded or otherwise connected as part of the spindle motor assembly. Similarly, a pattern of grooves, Rayleigh steps or other features can be formed on the motor shaft during the mold injection process to provide the appropriate pressure gradients for stabilizing the spindle motor during operation of the disc drive.

Use of polymeric materials for the hub and/or motor shaft also can facilitate the assembly process of the disc drive using snap-in features that easily can be formed by injection molding or other techniques. Such snap-in features can be used, for example, to hold the hub in place with respect to the motor shaft and to hold a disc in place.

Use of polymeric materials can, in some cases, provide a significant reduction in manufacturing and assembly costs because the various components can be made smaller.

Providing solid lubricants on selected areas of the of the surface of the hub and/or motor shaft can improve the tribology and reduce the amount of liquid lubricant that might otherwise be required as a result of absorption of the liquid lubricant by the polymeric hub or motor shaft.

Other features and advantages will be readily apparent from the following detailed description, the accompanying drawings, and the claims.

BRIEF DESCRIPTION OF THE DRAWINGS

FIGS. 5A, 5B and 5C illustrate assembly of the polymeric hub and motor shaft according to the invention.

FIG. 6 illustrates a hub and shaft with solid lubricant provided in areas of contact.

DETAILED DESCRIPTION

Figure 1:
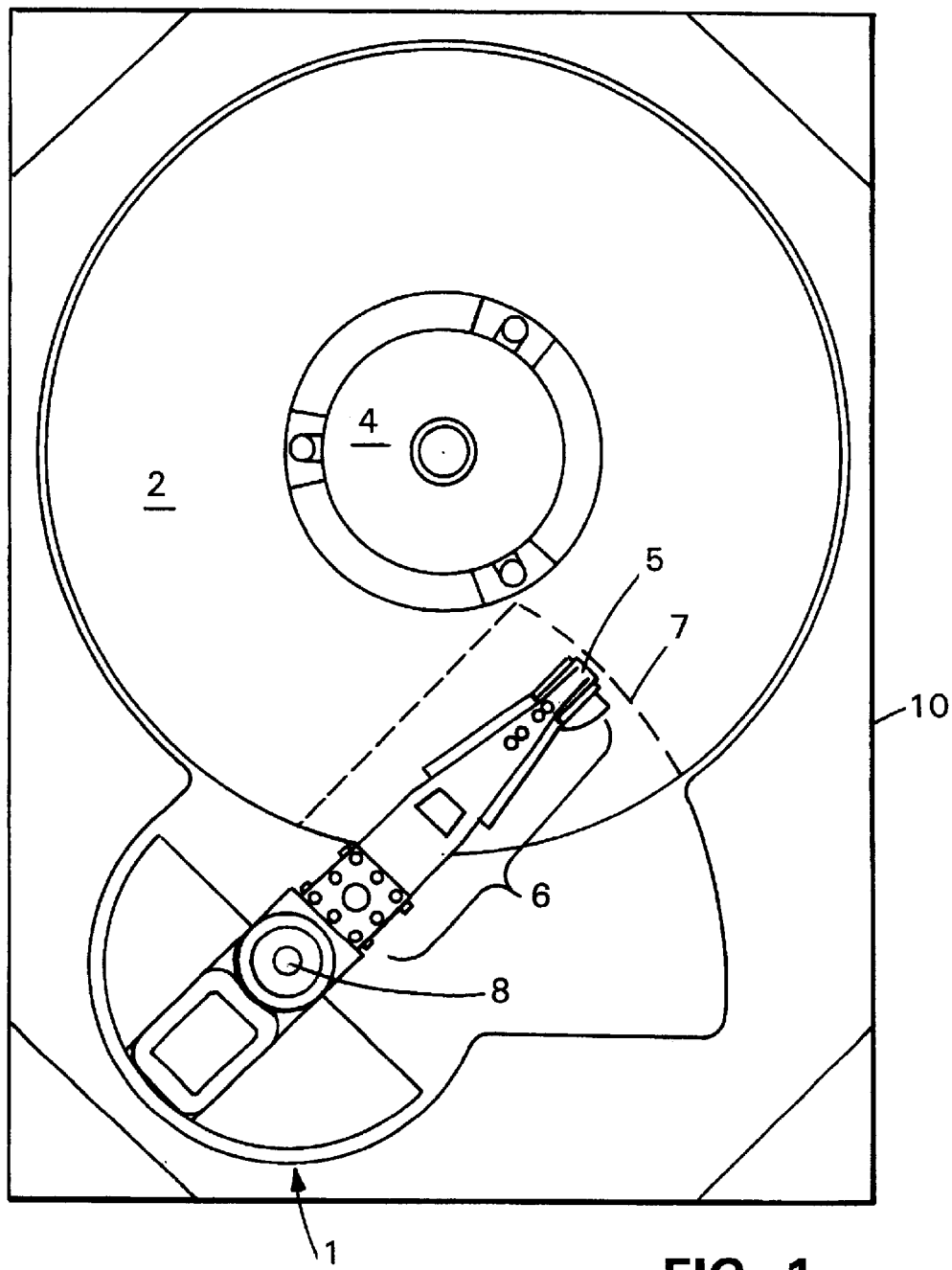
FIG. 1 is a top plan view of an exemplary disc drive.

As shown in FIG. 1, a disc drive 1 includes a disc 2 that is rotated by the spindle 4 of a spindle motor. As the disc 2 rotate, a transducer 5 mounted on the end of an actuator arm 6 is selectively positioned by a voice coil motor 8. The voice coil motor 8 moves the transducer from track to track over the surface of the disc. The foregoing elements can be mounted in an air-tight housing 10.

Figure 2A:
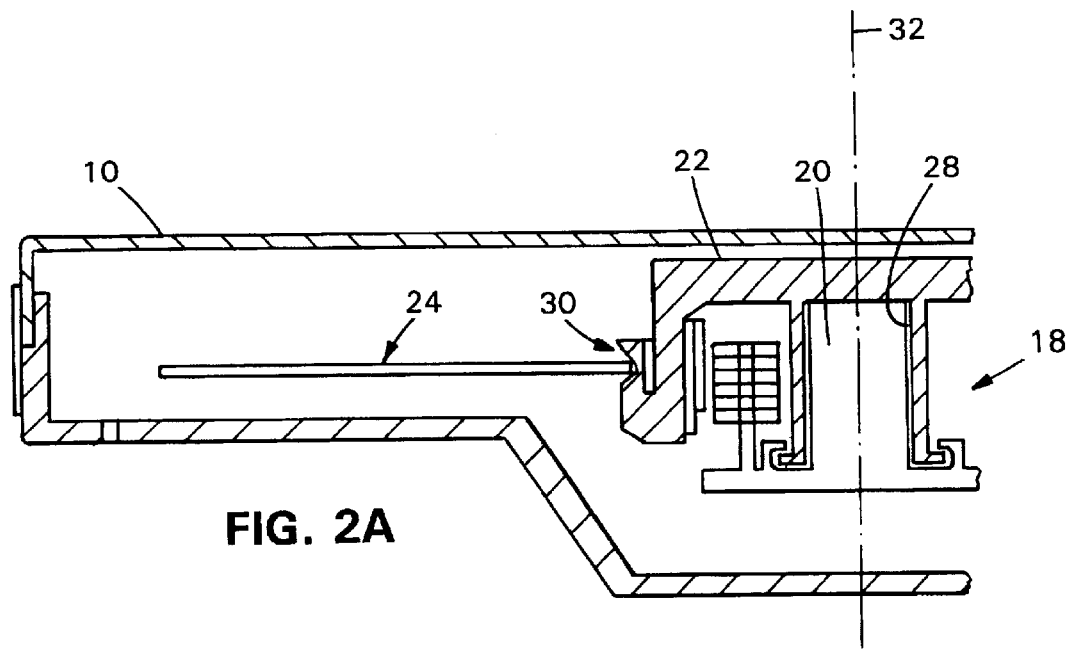
FIG. 2A is a partial cross-sectional view of one implementation of a spindle motor assembly according to the invention.
Figure 2B:
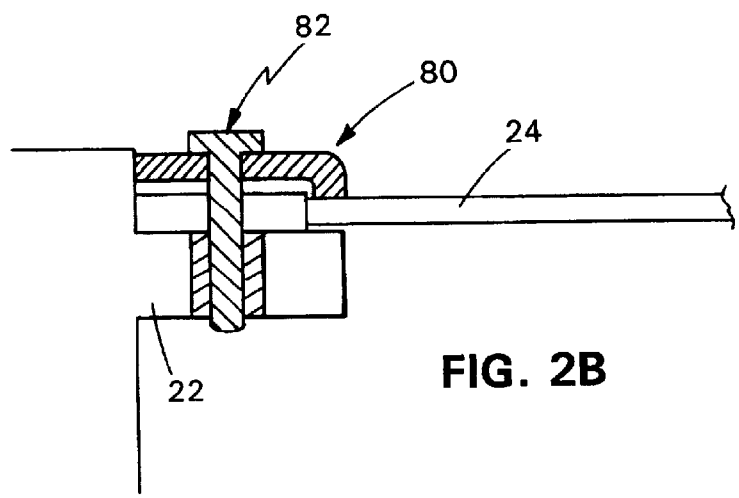
FIG. 2B shows details of the polymeric hub for holding a disc according to another implementation.

As indicated by FIG. 2A, the spindle motor assembly 18 is substantially symmetrical about the axis 32 and includes a motor shaft 20 over which a hub 22 is positioned. The motor shaft 20 and hub 22 can be formed as separate pieces each of which can comprise a polymer such as a liquid crystal polymer and which can be formed, for example, by an injection molding technique. The hub 22 supports a data storage disc 24 having a central aperture and which is held in place by a resilient snap-in retainer 30. In an alternative implementation, the disc 24 can be held in place by a fastener 80 that is connected to the hub 22, as shown in FIG. 2B. A screw 82 or similar insert can clamp the fastener 80 to hold the disc 24 in place.

A gap 28 exists between the two opposing surfaces formed by the hub 22 and the shaft 20. In some implementations, the width of the gap 28 is on the order of several microns. As described in greater detail below, the outer surface of the shaft 20 and an opposing surface of the hub 22 form one or more hydrodynamic journal bearings that are self-pressurizing air-bearings. During operation, the hub 22 rotates about the shaft 20 while holding the disc 24.

Figure 3:
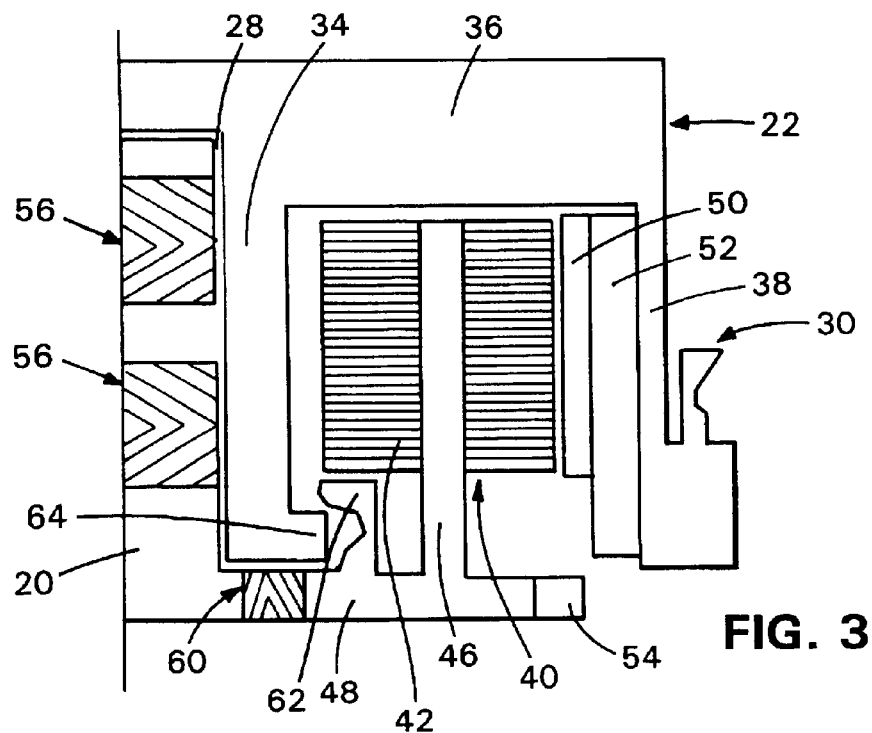
FIG. 3A shows further details of a polymeric motor shaft and polymeric hub according to the invention.

FIG. 3 shows further details of the polymeric motor shaft 20 and polymeric hub 22. The hub 22 includes an inner vertical section 34 that extends downward from a horizontal upper section 36 and which surrounds the motor shaft 20. The hub 22 also includes an outer vertical section 38 that extends downward from the horizontal upper section 36. The polymeric snap-in retainer 30 that holds the disc 24 in place can be molded to the outer vertical section 38 of the hub 22 during the mold injection process.

The upper horizontal section 36 and the inner and outer vertical sections 34, 38 of the hub 22 define an internal cavity within which a stator 40 is disposed. The stator 40 includes a series of coils 42 positioned around a laminated core (not shown). The stator 40 is supported by a vertical member 46 extending upward from a lower horizontal extension 48 of the shaft 20. The vertical member 46 that supports the stator 40 can be molded to the lower horizontal extension 48 and can be formed during mold injection of the shaft 20.

As further shown in FIG. 3, one or more permanent magnets 50 are attached to a back-iron 52 which, in turn, is attached to the inner surface of the hub's outer vertical section 38. The magnet(s) 50 interacts electro-magnetically with the coils 42 to cause rotational movement of the hub 22 about the motor shaft 20 during normal operation. Electrical activation of the coils 42 can be achieved by providing terminal leads to the stator 40.

The back-iron directs flux away from the magnet 50. An additional flux conducting ring 54 can be provided at or near the outer perimeter of the lower horizontal extension 48 of the shaft 20. Such a flux conducting ring 54, which can be formed, for example, from a metal such as stainless steel, serves as a magnetic preload to help maintain the hub 22 and shaft 20 in the proper relationship. The preload 54 forms a thrust bearing that helps overcome the weight of the disc and hub assembly.

Figure 4:
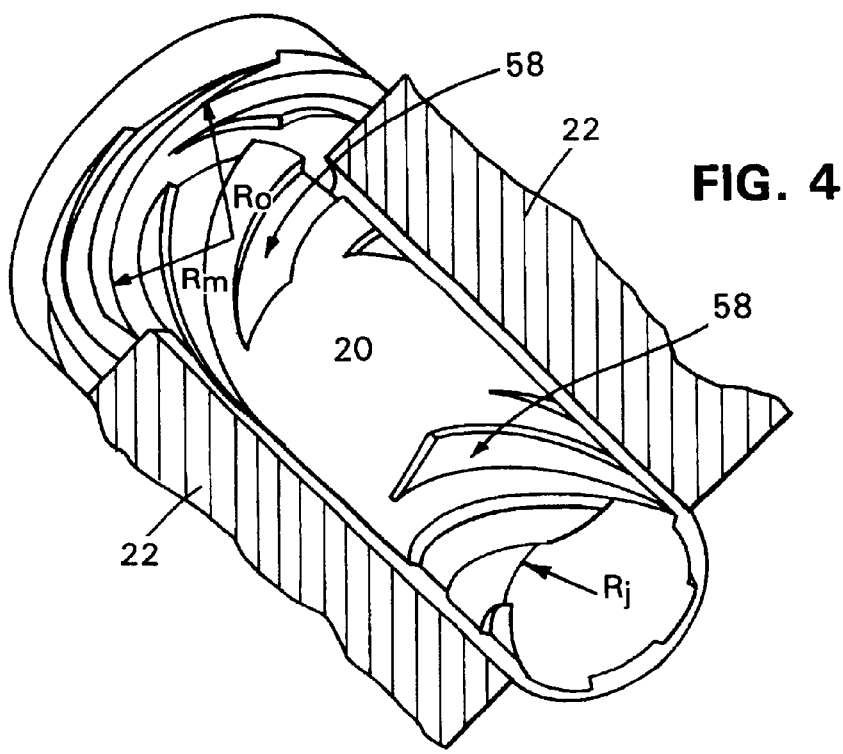
FIG. 4 illustrates an exemplary pattern of pressure generating features formed on the polymeric motor shaft.

A pattern of pressure generating features, such as a herringbone or similar pattern 56, is formed on the polymeric shaft 20 during the mold injection process. The self-pressurizing journal bearings that establish the stability of the spindle motor use the pattern of pressure generating features 56 on the shaft 20 to create pressure gradients in the gap 28 in order to provide radial stiffness. The herringbone pattern can include spiral grooves 58 (FIG. 4) formed in cylindrical sections of the shaft 20. Instead of a pattern of herringbone grooves, Rayleigh steps or other chevron patterns can be used. The depth and geometries of the grooves 58 or steps can be formed during the molding process.

As shown in FIG. 3, the shaft 20 also includes pressure generating features which form a thrust plate 60 in the lower horizontal extension 48 of the shaft. The thrust plate 60 provides axial stiffness for the hydrodynamic journal bearings.

As previously noted, the motor shaft 20 and hub 22 are polymeric components that can be formed separately by a mold injection technique. The back-iron 52 and magnet 50 can be attached to the hub 22 after it is molded. Alternatively, the back-iron 52 and magnet 50 can be provided as inserts to the mold during the mold injection process. Similarly, the stator 40 and flux conducting ring 54 can be attached to the shaft 20 after it is molded. Alternatively, the stator 40 and flux conducting ring 54 can be provided as inserts and molded to the shaft 20 during the mold injection process.

To facilitate positioning of the hub 22 with respect to the motor shaft 20, a resilient snap-in polymeric retainer 62 extends upward from the lower horizontal extension 48 of the shaft. An annular lip portion 64 near the bottom of the inner vertical section 34 of the hub 22 extends outward. When properly positioned, the snap-in retainer 62 extends partially over the annular lip portion 64 to hold the hub 22 in place. The snap-in retainer 62 can be molded to the lower horizontal extension 48 during formation of the shaft 20.

FIGS. 5A, 5B and 5C illustrate assembly of the hub 22 and the motor shaft 20. Initially, the hub 22 is positioned over the shaft 20 as shown in FIG. 5A so that the inner vertical section 34 surrounds the outer surface of the shaft.

Downward pressure is exerted on the hub 22 until the annular lip portion 64 contacts the snap-in retainer 62 and pushes it outward (FIG. 5B). Next, the hub 22 is pressed downward until the annular lip portion 64 rests above the upper surface of the horizontal extension 48. The snap-in retainer 62 resiliently springs back to it original position (FIG. 5C) to hold the hub in place. A disc 24 then can be placed over the hub 22 and held in place by the resilient snap-in retainer 30 or, alternatively, by use of the fastener 80 (FIG. 3B).

A liquid lubricant such as Z-dol (PFPFE lubricant) can be provided on the regions of the hub 22 and shaft 20 which contact one another. To improve the tribology and to reduce the amount of liquid lubricant that may be absorbed by the polymeric hub and/or shaft, a solid lubricant can be provided on the hub 22 and shaft 20 prior to the liquid lubricant. For example, as shown in FIG. 6, a diamond-like carbon (dlc) solid lubricant 66 such as a graphite film can be vacuum deposited on contact areas between the hub 22 and shaft 20. Such contact areas include the regions near the pressure generating features 56 formed on the shaft 20 as well as regions near the pressure generating features that form the thrust plate 60. The solid lubricant 66 can take the form of a dlc coating or dlc pads. Other solid lubricants, such as molybdenum sulfide ($MoS_2$) also can be used. The use of a solid lubricant can help reduce the wear and degradation of the liquid lubricant.

Other implementations are within the scope of the following claims.

What is claimed is:

1. A spindle motor assembly comprising a polymeric motor shaft, a polymeric hub to support a rotating a data storage disc, a snap-in retainer molded to the motor shaft to hold the hub in place, and a stator disposed in an internal cavity defined by the hub, a surface of the polymeric hub and an opposing surface of the polymeric motor shaft forming a hydrodynamic bearing.

2. The spindle motor assembly of claim 1 wherein the snap-in retainer is resilient.

3. The spindle motor assembly of claim 1 including a second snap-in retainer molded to the hub to hold the disc in place.

4. The spindle motor assembly of claim 1 including a fastener connected to the hub to hold the disc in place.

5. The spindle motor assembly of claim 1 wherein the stator includes coils and wherein a magnet is connected to the hub such that during operation of the disc drive, the magnet interacts with the coils to cause rotational movement of the hub about the motor shaft.

6. The spindle motor assembly of claim 5 wherein the magnet is attached to a back-iron connected to the hub.

7. The spindle motor assembly of claim 6 including a flux conducting ring disposed at an outer perimeter of a horizontal extension of the motor shaft.

8. The spindle motor assembly of claim 1 including pressure generating features formed in the polymeric motor shaft, wherein during operation of the spindle motor assembly, the journal bearing and pressure generating features create a pressure gradient in a gap between the surface of the motor shaft and the opposing surface of the hub.

9. The spindle motor assembly of claim 8 wherein the pressure generating features include spiral grooves formed in the motor shaft.

10. The spindle motor assembly of claim 8 wherein the pressure generating features include Rayleigh steps formed in the motor shaft.

11. The spindle motor assembly of claim 1 including a solid lubricant disposed on a surface of the hub that comes into contact with the motor shaft during operation of the spindle motor assembly.

12. The spindle motor assembly of claim 1 including a solid lubricant disposed on a surface of the motor shaft that comes into contact with the hub during operation of the spindle motor assembly.

13. A computer disc drive comprising:

a spindle motor assembly including:
a polymeric motor shaft having a pattern of pressure generating features,
a polymeric hub to support a rotating disc,
a stator disposed in an internal cavity defined by the hub, and
a snap-in retainer molded to the motor shaft to hold the hub in place,
wherein a surface of the polymeric hub and an opposing surface of the polymeric motor shaft form a hydrodynamic bearing, and wherein during operation of the disc drive, the journal bearing and pressure generating features create a pressure gradient in a gap between the surface of the motor shaft and the opposing surface of the hub.

14. The disc drive of claim 13 wherein the stator includes coils and wherein a magnet is connected to a back-iron attached to the hub and a flux conducting ring is disposed at an outer perimeter of a horizontal extension of the motor shaft, wherein during operation of the disc drive, the magnet interacts with the coils to cause rotational movement of the hub about the motor shaft, and the flux conducting ring forms a thrust bearing.

15. The computer disc drive of claim 13 including a second snap-in retainer molded to the hub to hold the disc in place.

16. A method of assembling a spindle motor assembly for a computer disc drive, the method comprising:

positioning a hub over a motor shaft;

pressing the hub downward so that an extension on the hub contacts a snap-in retainer molded to the motor shaft; and allowing the snap-in retainer to spring back to hold the hub in place.

17. The method of claim 16 further including:

holding a disc in place with a second snap-in retainer molded to the hub.

18. The method of claim 16 wherein the hub defines an internal cavity for a stator when the hub is held in place by the snap-in retainer.

19. A spindle motor assembly comprising a polymeric motor shaft, a polymeric hub to support a rotating a data storage disc, a stator disposed in an internal cavity defined by the hub, and means for holding the hub in place with respect to the motor shaft.

* * * * *